US011176896B2

(12) United States Patent
Lee et al.

(10) Patent No.: US 11,176,896 B2
(45) Date of Patent: *Nov. 16, 2021

(54) MULTI-LAYER DISPLAY DEVICE AND METHOD FOR DRIVING THE SAME

(71) Applicant: LG Display Co., Ltd., Seoul (KR)

(72) Inventors: ChangHo Lee, Paju-si (KR); YoonSung Tak, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,229

(22) Filed: Jun. 22, 2020

(65) Prior Publication Data

US 2020/0320938 A1 Oct. 8, 2020

Related U.S. Application Data

(63) Continuation of application No. 15/842,517, filed on Dec. 14, 2017, now Pat. No. 10,726,795.

(30) Foreign Application Priority Data

Dec. 26, 2016 (KR) ........................ 10-2016-0179093

(51) Int. Cl.
*G09G 5/10* (2006.01)
*G06F 3/038* (2013.01)
(Continued)

(52) U.S. Cl.
CPC ........... *G09G 3/342* (2013.01); *G09G 3/2003* (2013.01); *G09G 3/3413* (2013.01);
(Continued)

(58) Field of Classification Search
CPC ..... G09G 2300/023; G09G 3/003; G09G 3/36
See application file for complete search history.

(56) References Cited

U.S. PATENT DOCUMENTS 5,825,525 A 10/1998 Harwit
2009/0284692 A1* 11/2009 Yang .................... G02F 1/1336 349/95

(Continued)

FOREIGN PATENT DOCUMENTS

CN 102103839 A 6/2011
CN 102566118 A 7/2012

(Continued)

OTHER PUBLICATIONS

China National Intellectual Property Adminislialion, First Notification of Office Action, CN Patent Application No. 201711418410.8, dated Feb. 6, 2020, 19 pages.

(Continued)

*Primary Examiner* — Nan-Ying Yang
(74) *Attorney, Agent, or Firm* — Fenwick & West LLP

(57) ABSTRACT

A multi-layer display device and a method for driving the same are disclosed, in which an image of a front display panel may be displayed without being affected by an image of a rear display panel, and an image of a rear display panel may be displayed without being affected by an image of a front display panel. The multi-layer display device comprises a first display panel; and a second display panel arranged on a rear surface of the first display panel. The second display panel displays a second white image for a time period when the first display panel displays a first source image. The first display panel displays a first white image for a time period when the second display panel displays a second source image.

11 Claims, 10 Drawing Sheets

(51) Int. Cl.

| | |
|---|---|
| ***G09G 5/00*** | (2006.01) |
| ***G09G 3/34*** | (2006.01) |
| ***G09G 3/36*** | (2006.01) |
| ***G09G 3/20*** | (2006.01) |
| *G09G 3/00* | (2006.01) |

(52) U.S. Cl.

CPC ......... *G09G 3/3607* (2013.01); *G09G 3/3677* (2013.01); *G09G 3/3688* (2013.01); *G09G 3/003* (2013.01); *G09G 2300/023* (2013.01); *G09G 2310/08* (2013.01); *G09G 2320/064* (2013.01); *G09G 2320/0646* (2013.01)

(56) References Cited

U.S. PATENT DOCUMENTS

| | | | | |
|---|---|---|---|---|
| 2011/0149047 | A1 | 6/2011 | Min et al. | |
| 2012/0270649 | A1* | 10/2012 | Griswold | H04N 13/302 463/31 |
| 2013/0235002 | A1* | 9/2013 | Chiang | G09G 3/2025 345/204 |
| 2014/0184669 | A1 | 7/2014 | Oh et al. | |
| 2014/0285639 | A1 | 9/2014 | Gyoung et al. | |
| 2015/0228217 | A1* | 8/2015 | Perdices-Gonzalez | G09G 3/348 345/5 |

FOREIGN PATENT DOCUMENTS

| | | | |
|---|---|---|---|
| CN | 102681239 | A | 9/2012 |
| CN | 103903521 | A | 7/2014 |
| CN | 104024922 | A | 9/2014 |
| CN | 106165002 | A | 11/2016 |
| JP | 2006-330612 | A | 12/2006 |
| KR | 10-1337790 | B1 | 12/2013 |
| KR | 10-1464428 | B1 | 11/2014 |
| WO | WO 2013/176315 | A1 | 11/2013 |

OTHER PUBLICATIONS

United States Office Action, U.S. Appl. No. 15/842,517, dated Dec. 26, 2019, 17 pages.

United States Office Action, U.S. Appl. No. 15/842,517, dated Sep. 5, 2019 ,15 pages.

United States Office Action, U.S. Appl. No. 15/842,517, dated May 9, 2019, 14 pages.

China National Intellectual Property Administration, Office Action, CN Patent Application No. 201711418410.8, dated Sep. 15, 2020, 11 pages.

* cited by examiner

MULTI-LAYER DISPLAY DEVICE AND METHOD FOR DRIVING THE SAME

CROSS REFERENCE TO RELATED APPLICATIONS

This patent application is a continuation application of U.S. patent application Ser. No. 15/842,517 filed on Dec. 14, 2017 which claims the benefit of the Republic of Korea Patent Application No. 10-2016-0179093 filed on Dec. 26, 2016, each of which is hereby incorporated by reference in its entirety.

BACKGROUND

Field of Technology

The present disclosure relates to a multi-layer display device and a method for driving the same.

Discussion of the Related Art

Recently, with the advancement of the information age, a demand for a display device for displaying an image has been increased in various forms. As an example, a multi-layer display device that includes two overlapped display panels and displays an image has been recently suggested.

The multi-layer display device may express a stereoscopic effect by displaying different images having respective depth information on a front display panel and a rear display panel. That is, a user may feel depth differently between the image displayed on the front display panel and the image displayed on the rear display panel in accordance with an interval between the front display panel and the rear display panel. Therefore, the user may feel the stereoscopic effect.

FIG. 1 is an exemplary view illustrating an image displayed by a rear display panel, an image displayed by a front display panel, and an image displayed by combination of the front display panel and the rear display panel in a multi-layer display device.

Referring to FIG. 1, the image of the front display panel, which is displayed on an area corresponding to an area where a dark image is displayed on the rear display panel is not seen to a user normally if the front display panel and the rear display panel are combined with each other. Also, the image of the rear display panel, which is displayed on an area corresponding to an area where a dark image is displayed on the front display panel is not seen to a user normally if the front display panel and the rear display panel are combined with each other. That is, the image of the front display panel in the multi-layer display device is affected by the image of the rear display panel, and vice versa.

FIG. 2 is an exemplary view illustrating a color displayed by combination of a front display panel and a rear display panel when the rear display panel displays white, red, green, blue and black colors while the front display panel displays red, green, blue and black colors.

Referring to FIG. 2, if the rear display panel displays white color, since light reaches the front display panel by passing through the rear display panel, the color displayed by the front display panel cannot be displayed normally in spite of combination of the front display panel and the rear display panel. However, if the rear display panel displays red, green, blue and black colors, the color displayed by the front display panel is seen as black by combination of the front display panel and the rear display panel.

SUMMARY

Accordingly, the present disclosure is directed to a multi-layer display device and a method for driving the same, which substantially obviate one or more problems due to limitations and disadvantages of the related art.

An advantage of the present disclosure is to provide a multi-layer display device and a method for driving the same, in which an image of a front display panel may be displayed without being affected by an image of a rear display panel, and an image of a rear display panel may be displayed without being affected by an image of a front display panel.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a multi-layer display device comprising a first display panel; and a second display panel arranged on a rear surface of the first display panel. The second display panel displays a second white image for a time period when the first display panel displays a first source image. The first display panel displays a first white image for a time period when the second display panel displays a second source image.

In another aspect of the present disclosure, there is provided a method for driving a multi-layer display device, which comprises the steps of displaying a first source image on a first display panel and displaying a second white image on a second display panel arranged on a rear surface of the first display panel; and displaying a first white image on the first display panel and displaying a second source image on the second display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1A:
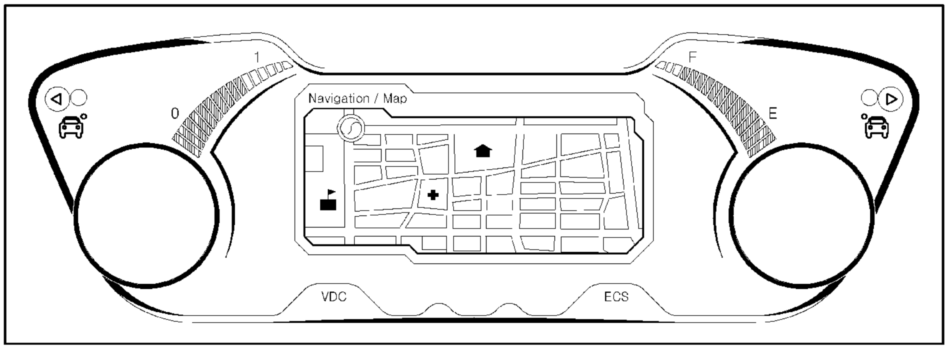
FIGS. 1A to 1C are exemplary views illustrating an image displayed by a rear display panel, an image displayed by a front display panel, and an image displayed by combination of the front display panel and the rear display panel in a multi-layer display device.
Figure 1B:
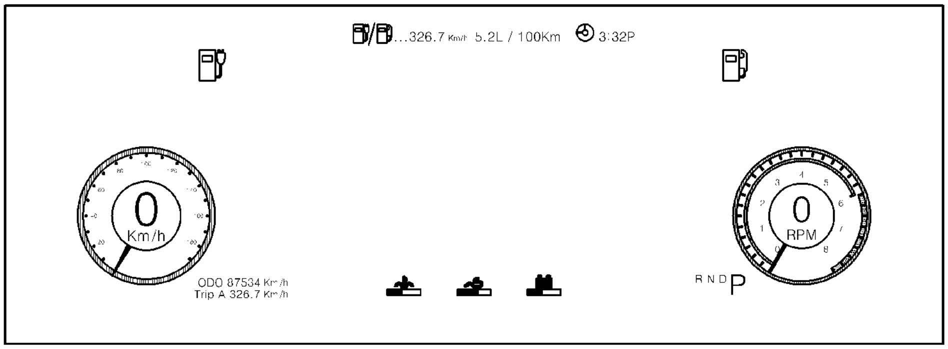
Figure 1C:
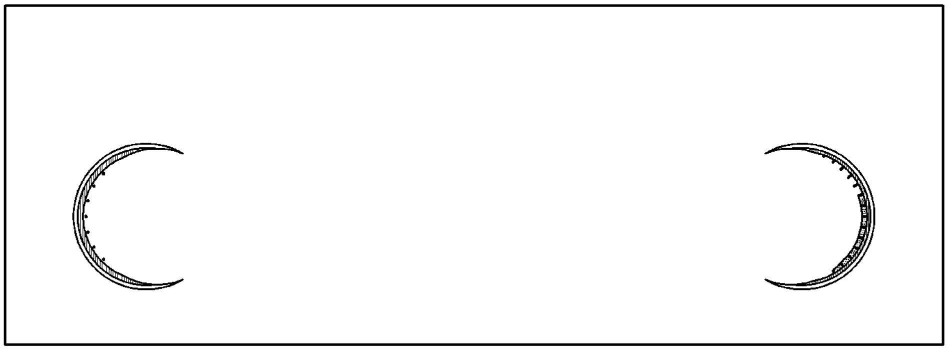
Figure 2:
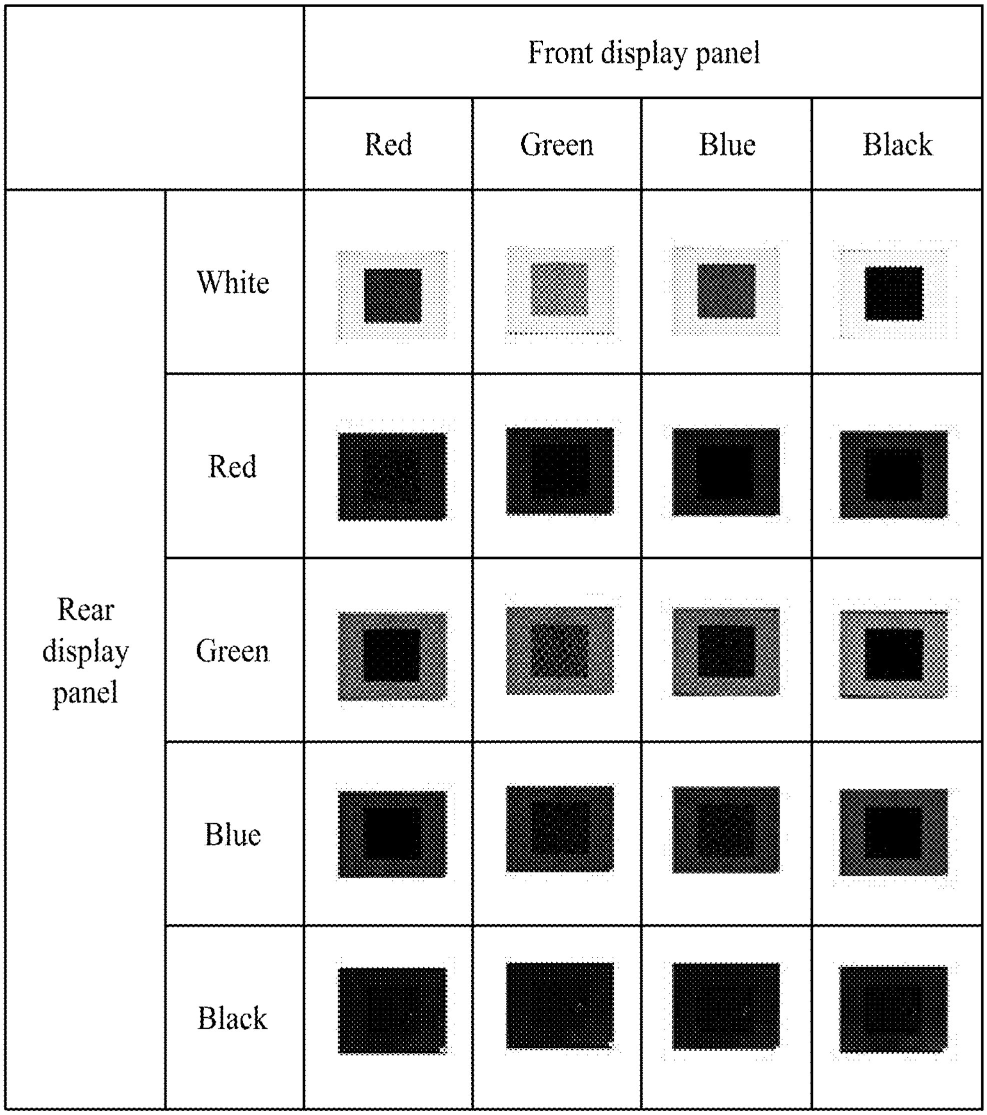
FIG. 2 is an exemplary view illustrating a color displayed by combination of a front display panel and a rear display panel when the rear display panel displays white, red, green, blue and black colors while the front display panel displays red, green, blue and black colors.

The same reference numbers substantially mean the same elements through the specification. In the following description of the present disclosure, if detailed description of elements or functions known in respect of the present disclosure is not relevant to the subject matter of the present disclosure, the detailed description will be omitted. The terms disclosed in this specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~', 'above~', 'below~', and 'next to~', one or more portions may be arranged between two other portions unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another element. Therefore, a first element could be termed a second element, and, similarly, a second element could be termed a first element, without departing from the scope of the present disclosure.

"X-axis direction", "Y-axis direction" and "Z-axis direction" should not be construed by a geometric relation only of a mutual vertical relation, and may have broader directionality within the range that elements of the present disclosure may act functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, the embodiments of the present disclosure will be described in detail with reference to the accompanying drawings.

Figure 3:
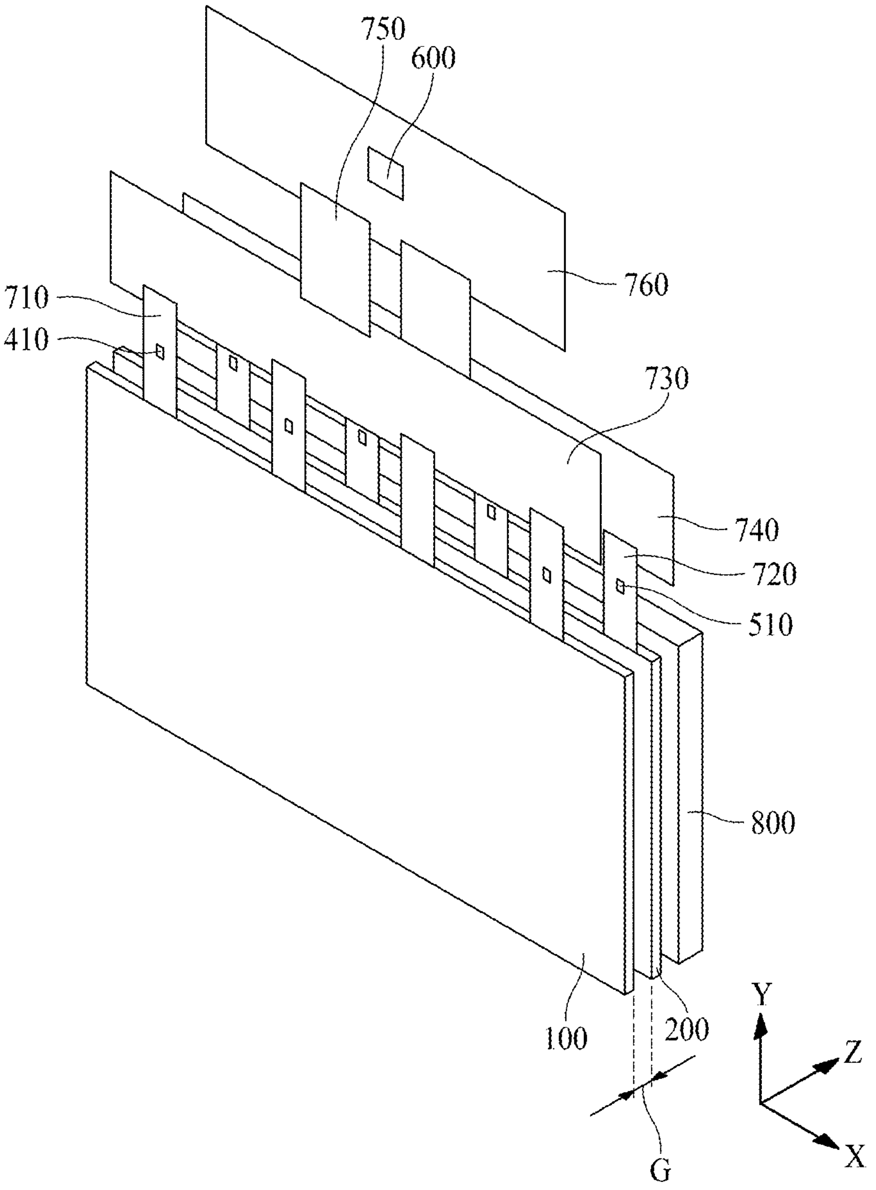
FIG. 3 is an exploded perspective view illustrating a multi-layer display device according to one embodiment of the present disclosure.
Figure 4:
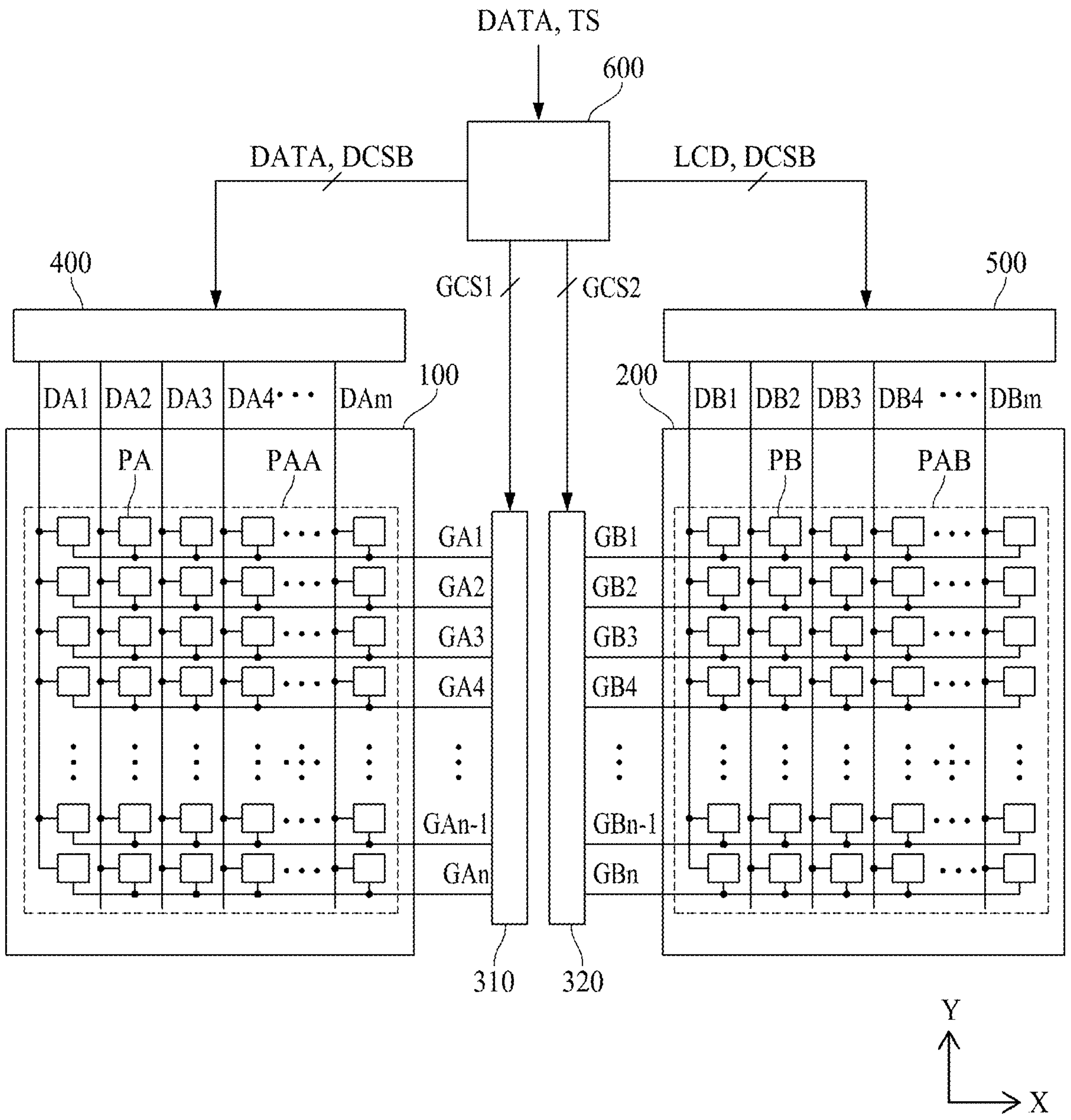
FIG. 4 is a block diagram illustrating a multi-layer display device according to one embodiment of the present disclosure.

FIG. 3 is an exploded perspective view illustrating a multi-layer display device according to one embodiment of the present disclosure. FIG. 4 is a block diagram illustrating a multi-layer display device according to one embodiment of the present disclosure.

The multi-layer display device according to the embodiment of the present disclosure will be described with reference to FIGS. 3 and 4. For convenience of description, in FIGS. 3 and 4, X-axis direction is parallel with a gate line, Y-axis direction is parallel with a data line, and Z-axis direction is a height direction of the multi-layer display device.

Referring to FIGS. 3 and 4, the multi-layer display device according to the embodiment of the present disclosure includes a first display panel 100, a second display panel 200, a first gate driver 310, a second gate driver 320, a first data driver 400, a second data driver 500, a timing controller 600, first flexible films 710, second flexible films 720, first and second source circuit boards 730 and 740, a flexible cable 750, a control circuit board 760, and a backlight unit 800.

The first and second display panels 100 and 200 may be realized as liquid crystal display panels.

The first display panel 100 includes a lower substrate, an upper substrate, and a liquid crystal layer formed between the lower and upper substrates. First gate lines GA1 to GAn (n is an integer of 2 or more) and first data lines DA1 to DAm (m is an integer of 2 or more) are formed on the lower substrate of the first display panel 100, and first pixels PA are formed at crossing areas of the first gate lines GA1 to GAn and the first data lines DA1 to DAm. An area where the first pixels PA are formed may be defined as a first display area PAA.

The second display panel 200 is arranged on a rear surface of the first display panel 100. The second display panel 200 includes a lower substrate, an upper substrate, and a liquid crystal layer formed between the lower and upper substrates. Second gate lines GB1 to GBn and second data lines DB1 to DBm are formed on the lower substrate of the second display panel 200, and second pixels PB are formed at crossing areas of the second gate lines GB1 to GBn and the second data lines DB1 to DBm. An area where the second pixels PB are formed may be defined as a second display area PAB.

Figure 5:
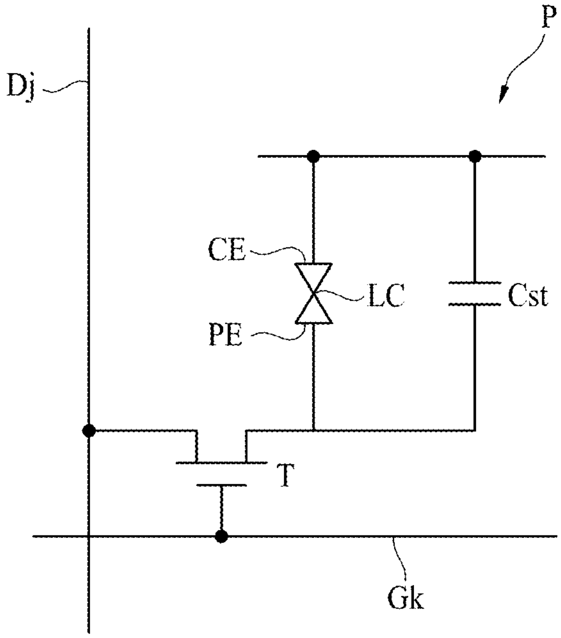
FIG. 5 is a circuit diagram illustrating each of first and second pixels of FIG. 4 according to one embodiment of the present disclosure.

Each of the first pixels PA and the second pixels PB may include a transistor T, a pixel electrode PE, a common electrode CE, and a storage capacitor Cst as shown in FIG. 5. The transistor T may be a thin film transistor formed by a semiconductor process. The transistor T supplies a data voltage of the jth data line Dj (j is a positive integer that satisfies $1 \le j \le m$) to the pixel electrode PE in response to the kth gate line Gk (k is a positive integer that satisfies $1 \le k \le m$). For this reason, each of the pixels P may control transmittance of light from a backlight unit by driving liquid crystals of the liquid crystal layer LC through an electric field generated by a potential difference between the data voltage supplied to the pixel electrode PE and the common voltage supplied to the common electrode CE. Also, the storage capacitor Cst is provided between the pixel electrode PE and the common electrode CE, and uniformly maintains the potential difference between the pixel electrode PE and the common electrode CE.

A black matrix and color filters may be formed on the upper substrate of each of the first and second display panels 100 and 200. If each of the first and second display panels 100 and 200 is formed in a color filter on TFT (COT) array, the black matrix and the color filters may be formed on the lower substrate.

The common electrode CE may be formed on the upper substrate 112 in a vertical electric field driving mode such as a twisted nematic (TN) mode and a vertical alignment (VA) mode, and may be formed on the lower substrate 111 together with the pixel electrode PE in a horizontal electric field driving mode such as an in-plane switching (IPS) mode and a fringe field switching (FFS) mode. The liquid crystal display device of the present disclosure may be implemented in any liquid crystal mode as well as the TN mode, the VA mode, the IPS mode and the FFS mode. Also, an upper polarizing plate may be attached to the upper substrate of each of the first and second display panels 100 and 200, and a lower polarizing plate may be attached to the lower substrate of each of the first and second display panels 100 and 200. Also, an alignment film for setting a pre-tilt angle of the liquid crystal may be formed on the upper substrate and the lower substrate of each of the first and second display panels 100 and 200.

The first display panel 100 and the second display panel 200 may be attached to each other by an adhesive layer. The adhesive layer may be a transparent adhesive film such as an optically clear adhesive (OCA), or a transparent adhesive such as an optically clear resin (OCR).

Also, if a gap G exists between the first display panel 100 and the second display panel 200, depth may be formed between an image displayed on the first display panel 100 and an image displayed on the second display panel 200. The image displayed on the first display panel 100 and the image displayed on the second display panel 200 may be images different from each other, or may partially be overlapped with each other or not. Therefore, a user may feel depth between the image displayed on the first display panel 100 and the image displayed on the second display panel 200 in accordance with an interval between the first display panel 100 and the second display panel 200. That is, the user may feel a stereoscopic effect.

The first gate driver 310 supplies first gate signals to the first gate lines GA1 to GAn of the first display panel 100 in accordance with a first gate control signal GCS1 input from the timing controller 600, thereby selecting the first pixels PA to which first data voltages will be supplied.

The second gate driver 320 supplies second gate signals to the second gate lines GB1 to GBn of the second display panel 200 in accordance with a second gate control signal GCS2 input from the timing controller 600, thereby selecting the second pixels PB to which second data voltages will be supplied.

The first gate driver 310 may be formed on a non-display area of the first display panel 100 in a gate driver in panel (GIP) mode, and the second gate driver 320 may be formed on a non-display area of the second display panel 200 in a GIP mode. The non-display area indicates an area where an image is not displayed.

Alternatively, the first gate driver 300 may be fabricated of a driving chip, packaged in a gate flexible film and attached to the first display panel 100 in a tape automated bonding (TAB) mode. Also, the second gate driver 320 may be fabricated of a driving chip, packaged in a gate flexible film and attached to the second display panel 200 in a tape automated bonding (TAB) mode.

The first data driver 400 includes at least one or more first source drive integrated circuits (IC) 410. The first source drive ICs 410 receive first image data DATA1 and a first data control signal DCSA from the timing controller 600. The first image data DATA1 may include first source image data SD1 and first white image data WD1. The first source drive ICs 410 convert the first image data DATA1 to first data voltages in accordance with the first data control signal DCSA and supplies the first data voltages to the first data lines DA1 to DAm. The source drive IC 410 may be packaged in the first flexible film 710 in a chip on film (COF) or chip on plastic (COP) mode. The first flexible film 710 may be attached to the first display panel 100 by an anisotropic conducting film.

The timing controller 600 generates a first gate control signal GCS1 for controlling an operation timing of the first gate driver 310, a second gate control signal GCS2 for controlling an operation timing of the second gate driver 320, a first data control signal DCSA for controlling the first source drive ICs 410 of the first data driver 400, and a second data control signal DCSB for controlling the second source drive ICs 510 of the second data driver 500 in accordance with timing signals TS. The timing controller 600 supplies the first gate control signal GCS1 to the first gate driver 310, supplies the second gate control signal GCS2 to the second gate driver 320, supplies the first data control signal DCSA to the first source drive ICs 410 of the first data driver 400 and supplies the second data control signal DCSB to the second source drive ICs 510 of the second data driver 500.

The timing controller 600 may be packaged in the control circuit board 760. The control circuit board 760 may be connected to each of the first and second source circuit boards 730 and 740 by a flexible cable 750. The control circuit board 760 may be a printed circuit board or a flexible printed circuit board.

The backlight unit 800 is arranged on a rear surface of the second display panel 200, and includes light sources for emitting light. The backlight unit 800 may be implemented as a direct type or an edge type. If the backlight unit 800 is implemented as a direct type, the backlight unit 800 has a structure that a plurality of optical sheets and a diffusion plate are deposited below the second display panel 200 and the plurality of light sources are arranged below the diffusion plate. If the backlight unit 800 is implemented as an edge type, the backlight unit 800 has a structure that a plurality of optical sheets and a light guide plate are deposited below the second display panel 200 and the plurality of light sources are arranged at a side of the light guide plate.

A backlight driver receives backlight data from the timing controller 600, and generates a driving current for allowing the light sources to emit light in accordance with the backlight data and then supplies the generated driving current to the light sources. For this reason, the light sources of the backlight unit may emit light in accordance with the driving current.

As described above, the embodiment of the present disclosure may include the first and second display panels 100 and 200 having a predetermined interval, whereby depth may be formed between the first image displayed on the first display panel 100 and the second image displayed on the second display panel 200. As a result, the embodiment of the present disclosure may provide a stereoscopic image to a user.

Figure 6:
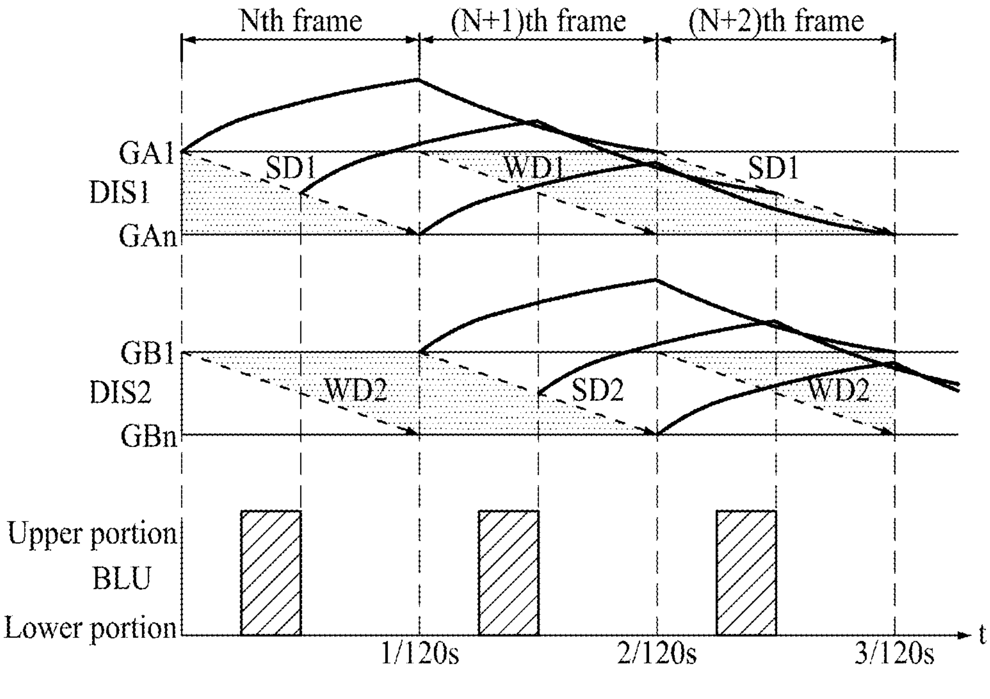
FIG. 6 is an exemplary view illustrating response characteristic of data and liquid crystal supplied to a first display panel, response characteristic of data and liquid crystal supplied to a second display panel, and a lighting timing of a backlight unit according to one embodiment of the present disclosure.
Figure 7:
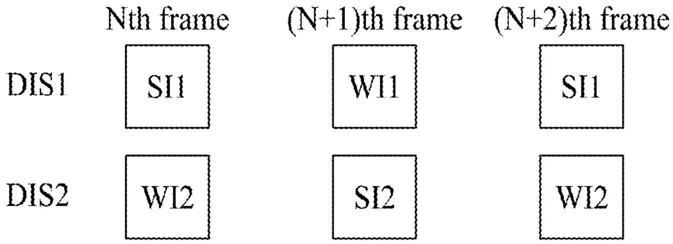
FIG. 7 is an exemplary view illustrating a display image of a first display panel and a display image of a second display panel for first Nth to (N+2)th frame time periods according to one embodiment of the present disclosure.

FIG. 6 is an exemplary view illustrating response characteristic of data and liquid crystal supplied to a first display panel, response characteristic of data and liquid crystal supplied to a second display panel, and a lighting timing of a backlight unit according to one embodiment of the present disclosure. FIG. 7 is an exemplary view illustrating a display image of a first display panel and a display image of a second display panel for first Nth to (N+2)th frame time periods.

FIGS. 6 and 7 illustrate that first and second display panels DIS1 and DIS2 and a backlight unit BLU are driven at a frame frequency of 120 Hz. If the first and second display panels DIS1 and DIS2 and the backlight unit BLU are driven at a frame frequency of 120 Hz, they may include 120 frame time periods for one second.

Referring to FIGS. 6 and 7, the first display panel DIS1 displays a first source image SI1 in accordance with first source image data SD1 for the Nth and (N+2)th frame time periods, and displays a first white image WI1 in accordance with first white image data WD1 for the N+1 frame time period. The first white image may be defined as a transmissive image that transmits light entering the first display panel DIS1. Since the first display panel DIS1 transmits light incident from the second display panel DIS2 without displaying the first source image for the (N+1)th frame time period, a second source image of the second display panel DIS2 may be seen to a user as it is.

In more detail, the timing controller 600 supplies the first source image data SD1 to the first data driver 400 for the Nth and (N+2)th frame time periods, and supplies the first white image data WD1 to the first data driver 400 for the (N+1)th frame time period. In this case, the first data driver 400 may convert the first white image data WD1 to data voltages for the (N+1)th frame time period and supply the data voltages to the first display panel DIS1, thereby displaying the first white image.

The second display panel DIS2 displays a second white image in accordance with second white image data WD2 for the Nth and (N+2)th frame time periods, and displays a second source image in accordance with second source image data SD2 for the N+1 frame time period. The second white image may be defined as a transmissive image that transmits light entering the second display panel DIS1. Since the second display panel DIS2 transmits light incident from the backlight unit BLU without displaying the second source image for the Nth and (N+1)th frame time periods, the first source image of the first display panel DIS1 may be seen to a user as it is without being affected by the image of the second display panel DIS2.

In more detail, the timing controller 600 supplies the second white image data WD2 to the second data driver 500 for the Nth and (N+2)th frame time periods, and supplies the second source image data SD2 to the second data driver 500 for the (N+1)th frame time period. In this case, the second data driver 500 may convert the second white image data WD2 to data voltages for the Nth and (N+2)th frame time periods and supply the data voltages to the second display panel DIS2, thereby displaying the second white image.

The first source image SI1 and the second source image SI2 may be images different from each other, or may partially be overlapped with each other or not. That is, the first source image data SI1 and the second source image data SI2 may be data different from each other. Also, the first white image SD1 and the second white image SD2 may be images the same as each other. That is, the first white image data WD1 and the second white image data WD2 may be data the same as each other.

The light sources of the backlight unit BLU may emit light according to a predetermined duty ratio for each of the Nth and (N+2)th frame time periods. The duty ratio may be defined as expressed by the following Equation 1.

$$DR\ (\%) = \frac{LH}{FL} \quad \text{[Equation 1]}$$

In the Equation 1, DR (%) denotes a duty ratio, and FL denotes a length of one frame time period, and LH denotes a lighting time period.

Figure 8:
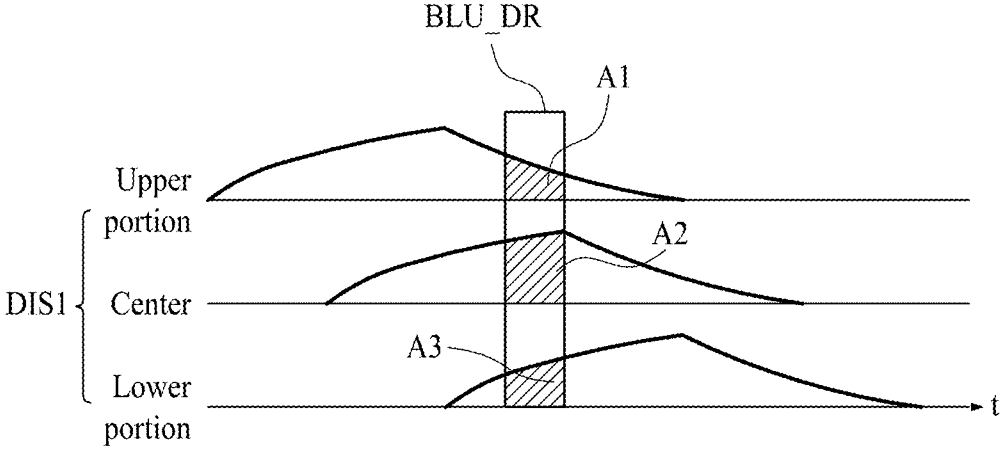
FIG. 8 is an exemplary view illustrating areas of liquid crystal response curves of upper, center and lower portions of a first display panel for a lighting time period according to one embodiment of the present disclosure.

FIG. 6 illustrates, but is not limited to, that the light sources of the backlight unit BLU emits light according to a predetermined duty ratio at the time when the first source image data SD1 or the second source image data SD2 are supplied to the center of the first display panel DIS1 or the second display panel DIS2. The light sources of the backlight unit BLU may emits light such that a difference among an area A1 of a liquid crystal response curve at an upper portion of the first display panel DIS1 or the second display panel DIS2, an area A2 of a liquid crystal response curve at the center of the first display panel DIS1 or the second display panel DIS2, and an area A3 of a liquid crystal response curve at a lower portion of the first display panel DIS1 or the second display panel DIS2 is minimized for a lighting time period as shown in FIG. 8. In this case, since the area difference of the liquid crystal response curves in the first display panel DIS1 or the second display panel DIS2 may be minimized, luminance non-uniformity per area of the display panel 110 may be minimized.

Figure 15:
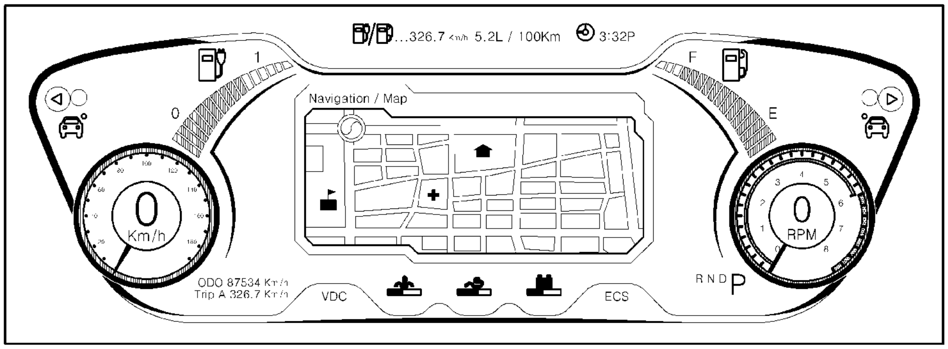
FIG. 15 is an exemplary view illustrating an image of a multi-layer display device to which the embodiment of the present disclosure is applied.

As described above, in the embodiment of the present disclosure, the second display panel DIS2 corresponding to a rear display panel displays a second white image WI2 for a time period when the first display panel DIS1 corresponding to a front display panel displays a first source image SI1, and the second display panel DIS2 displays a second source image SI2 for a time period when the first display panel DIS1 displays a first white image WI1. The first white image WI1 may be defined as a transmissive image that transmits light entering the first display panel DIS1, and the second white image WI2 may be defined as a transmissive image that transmits light entering the second display panel DIS2. As a result, in the embodiment of the present disclosure, the first source image SI1 of the first display panel DIS1 may be displayed without being affected by the second display panel DIS2, and the second source image SI2 of the second display panel DIS2 may be displayed without being affected by the first display panel DIS1. Therefore, in the embodiment of the present disclosure, as shown in FIG. 15, the user may definitely see a combined image of the first source image SI1 of the first display panel DIS1 and the second source image SI2 of the second display panel DIS2.

Figure 9:
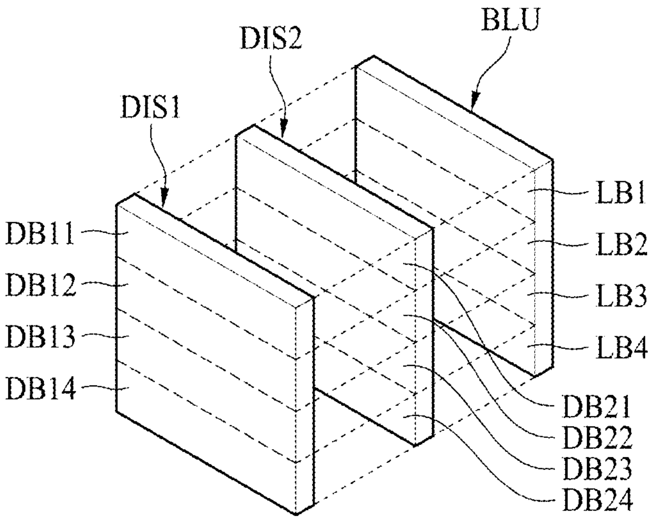
FIG. 9 is an exemplary view illustrating response characteristic of data and liquid crystal supplied to a first display panel, response characteristic of data and liquid crystal supplied to a second display panel, and a lighting timing of a backlight unit according to another embodiment of the present disclosure.
Figure 10:
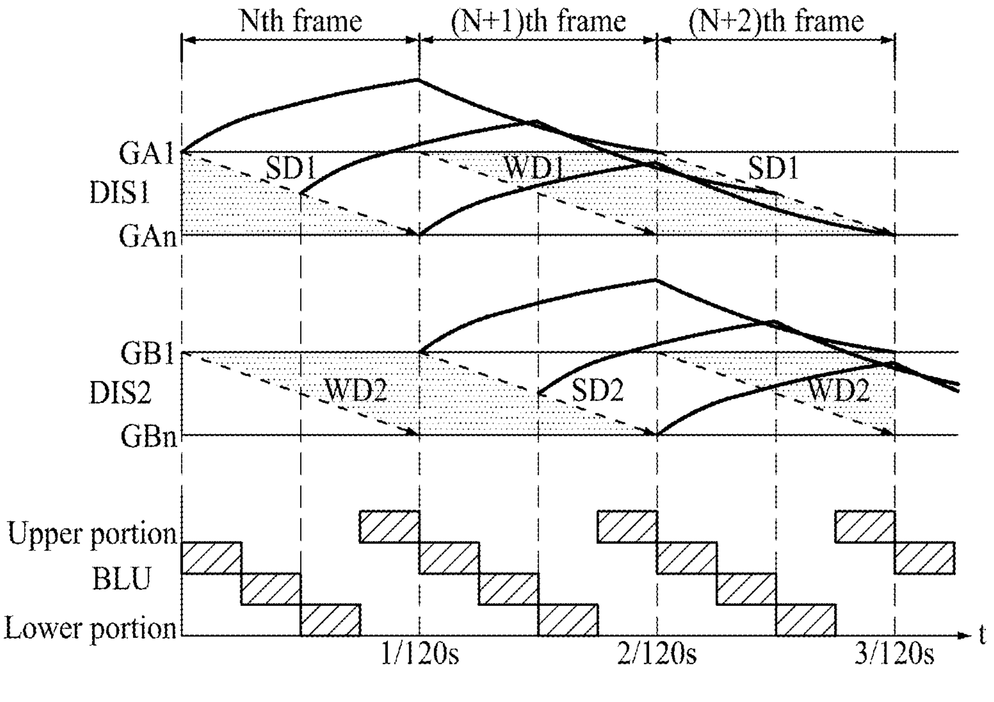
FIG. 10 is an exemplary view illustrating first display blocks of a first display panel, second display blocks of a second display panel, and lighting blocks of a backlight unit.

FIG. 9 is an exemplary view illustrating response characteristic of data and liquid crystal supplied to a first display panel, response characteristic of data and liquid crystal supplied to a second display panel, and a lighting timing of a backlight unit according to another embodiment of the present disclosure. FIG. 10 is an exemplary view illustrating first display blocks of a first display panel, second display blocks of a second display panel, and lighting blocks of a backlight unit.

FIG. 9 illustrates that first and second display panels DIS1 and DIS2 and a backlight unit BLU are driven at a frame frequency of 120 Hz. If the first and second display panels and the backlight unit are driven at a frame frequency of 120 Hz, they may include 120 frame time periods for one second.

Since response characteristic of liquid crystal and data supplied to the first display panel DIS1 and response characteristic of liquid crystal and data supplied to the second display panel DIS2, which are shown in FIG. 9, are substantially the same as those described with reference to FIG. 6, their detailed description will be omitted.

Referring to FIGS. 9 and 10, the first display panel DIS1 may be divided into a plurality of first display blocks DB11 to DB14, the second display panel DIS2 may be divided into a plurality of second display blocks DB21 to DB24, and the backlight unit BLU may be divided into a plurality of lighting blocks LB1 to LB4. The first display blocks DB11 to DB14, the second display blocks DB21 to DB24 and the lighting blocks LB1 to LB4 may be arranged to correspond to one another. FIG. 9 illustrates, but is not limited to, that each of the first and second display panels and the backlight unit is divided into four blocks such as the first display blocks DB11 to DB14, the second display blocks DB21 to DB24 and the lighting blocks LB1 to LB4.

Light of each of the lighting blocks LB1 to LB4 of the backlight unit BLU may be irradiated to each of the first display blocks DB11 to DB14 of the first display panel DIS1 and each of the second display blocks DB21 to DB24 of the second display panel DIS2. For example, light of the first lighting block LB1 of the backlight unit BLU may be irradiated to a 1-1th display block DB11 of the first display panel DIS1 and a 2-1th display block DB21 of the second display panel DIS2. Also, light of the second lighting block LB2 of the backlight unit BLU may be irradiated to a 1-2th display block DB12 of the first display panel DIS1 and a 2-2th display block DB22 of the second display panel DIS2. Also, light of the third lighting block LB3 of the backlight unit BLU may be irradiated to a 1-3th display block DB13 of the first display panel DIS1 and a 2-3th display block DB23 of the second display panel DIS2. Also, light of the fourth lighting block LB4 of the backlight unit BLU may be irradiated to a 1-4th display block DB14 of the first display panel DIS1 and a 2-4th display block DB24 of the second display panel DIS2.

The lighting blocks LB1 to LB4 of the backlight unit may emit light sequentially according to a predetermined duty ratio for each of the Nth and (N+2)th frame time periods. For example, the lighting blocks LB1 to LB4 of the backlight unit BLU may emit light sequentially from the first lighting block LB1 arranged at an upper portion to the fourth lighting block LB4 arranged at a lower portion.

That is, since each of the first display panel DIS1 and the second display panel DIS2 is supplied with image data from the upper portion to the lower portion, liquid crystal response curves at the upper portion, the center and the lower portion of each of the first display panel DIS1 and the second display panel DIS2 are different from one another. In the embodiment of the present disclosure, the lighting blocks LB1 to LB4 of the backlight unit BLU may emit light sequentially from the first lighting block LB1 arranged at the upper portion to the lighting block LB4 arranged at the lower portion. As a result, in the embodiment of the present disclosure, the light sources of the backlight unit BLU may emit light to correspond to saturated periods of the liquid crystal response curves at the upper portion, the center and the lower portion of each of the first display panel DIS1 and the second display panel DIS2. Therefore, in the embodiment of the present disclosure, the user may definitely see a combined image of the first source image SI1 of the first display panel DIS1 and the second source image SI2 of the second display panel DIS2.

Figure 11:
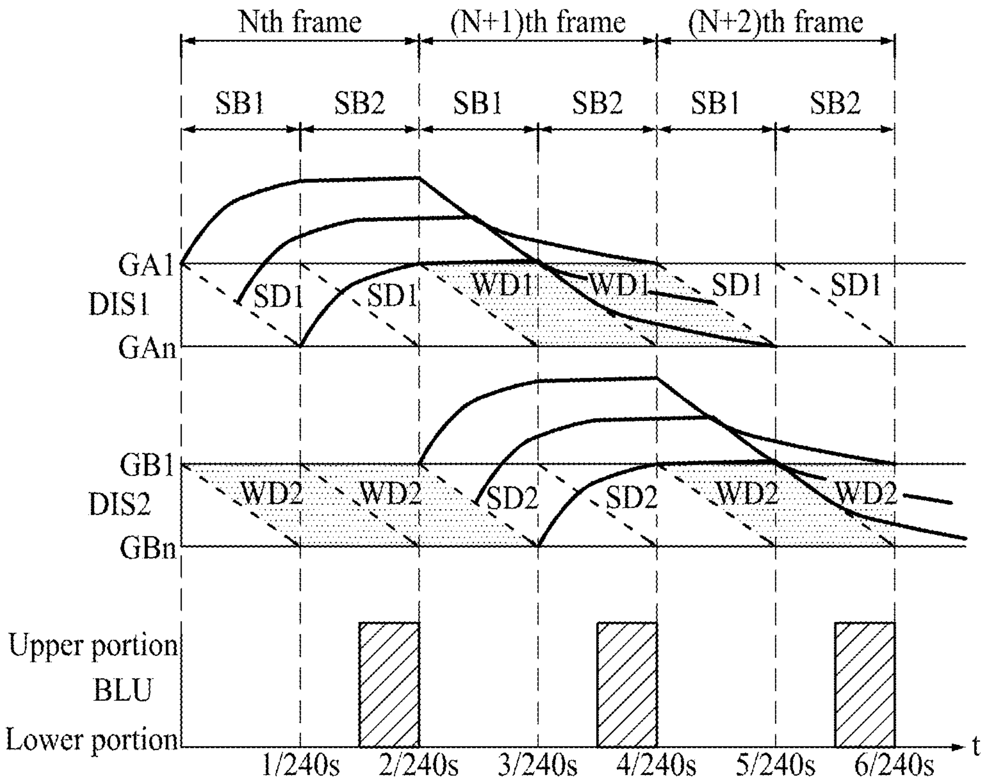
FIG. 11 is an exemplary view illustrating response characteristic of data and liquid crystal supplied to a first display panel, response characteristic of data and liquid crystal supplied to a second display panel, and a lighting timing of a backlight unit according to still another embodiment of the present disclosure.
Figure 12:
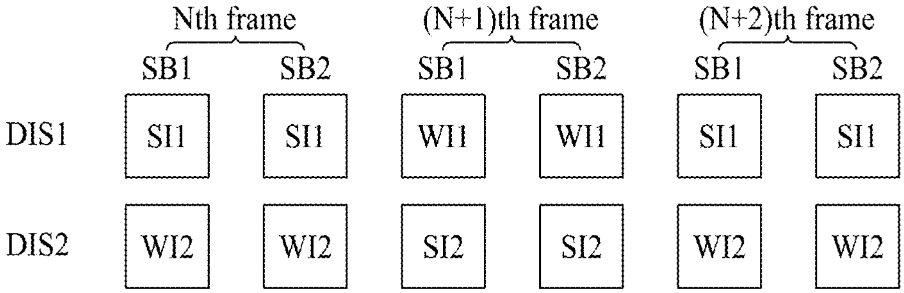
FIG. 12 is an exemplary view illustrating a display image of a first display panel and a display image of a second display panel for first Nth to (N+5)th frame time periods according to one embodiment of the present disclosure.

FIG. 11 is an exemplary view illustrating response characteristic of data and liquid crystal supplied to a first display panel, response characteristic of data and liquid crystal supplied to a second display panel, and a lighting timing of a backlight unit according to still another embodiment of the present disclosure. FIG. 12 is an exemplary view illustrating a display image of a first display panel and a display image of a second display panel for first Nth to (N+5)th frame time periods.

FIGS. 11 and 12 illustrate that first and second display panels DIS1 and DIS2 and a backlight unit BLU are driven at a frame frequency of 240 Hz. If the first and second display panels DIS1 and DIS2 and the backlight unit BLU are driven at a frame frequency of 240 Hz, they may include 240 frame time periods for one second.

Referring to FIGS. 11 and 12, each of the Nth to (N+2)th frame time periods includes first and second sub-frame time periods SB1 and SB2. The first display panel DIS1 displays a first source image SI1 in accordance with first source image data SD1 for the first and second sub-frame time periods of each of the Nth and (N+2)th frame time periods, and displays a first white image in accordance with first white image data WD1 for the first and second sub-frame time periods SB1 and SB2 of the N+1 frame time period. The first white image may be defined as a transmissive image that transmits light entering the first display panel DIS1. Since the first display panel DIS1 transmits light incident from the second display panel DIS2 without displaying the first source image for the (N+1)th frame time period, a second source image of the second display panel DIS2 may be seen to a user as it is.

In more detail, the timing controller 600 supplies the first source image data SD1 to the first data driver 400 for the first and second sub-frame time periods of each of the Nth and (N+2)th frame time periods, and supplies the first white image data WD1 to the first data driver 400 for the first and second sub time periods SB1 and SB2 of the (N+1)th frame time period. In this case, the first data driver 400 may convert the first white image data WD1 to data voltages for the first and second sub time periods SB1 and SB2 of each of the Nth and (N+2)th frame time periods and supply the data voltages to the first display panel DIS1, thereby displaying the first source image.

The second display panel DIS2 displays a second white image in accordance with second white image data WD2 for the first and second sub-frame time periods SB1 and SB2 of each of the Nth and (N+2)th frame time periods, and displays a second source image in accordance with second source image data SD2 for the first and second sub-frame time periods SB1 and SB2 of the N+1 frame time period. The second white image may be defined as a transmissive image that transmits light entering the second display panel DIS1. Since the second display panel DIS2 transmits light incident from the backlight unit BLU without displaying the second source image for the first and second sub-frame time periods SB1 and SB2 of each of Nth and (N+1)th frame time periods, the first source image of the first display panel DIS1 may be seen to a user as it is without being affected by the image of the second display panel DIS2.

In more detail, the timing controller 600 supplies the second white image data WD2 to the second data driver 500 for the first and second sub-frame time periods SB1 and SB2 of each of the Nth and (N+2)th frame time periods, and supplies the second source image data SD2 to the second data driver 500 for the first and second sub-frame time periods SB1 and SB2 of the (N+1)th frame time period. In this case, the second data driver 500 may convert the second white image data WD2 to data voltages for the first and second sub-frame time periods SB1 and SB2 of each of Nth and (N+2)th frame time periods and supply the data voltages to the second display panel DIS2, thereby displaying the second source image. In the embodiment of the present disclosure, the second source image data SD2 or the second white image data WD2 may be supplied repeatedly for the first and second sub-frame time periods SB1 and SB2 of each of the Nth and (N+2)th frame time periods, whereby liquid crystal response speed may be enhanced.

The light sources of the backlight unit BLU may emit light according to a predetermined duty ratio for each of the Nth and (N+2)th frame time periods.

FIG. 11 illustrates, but is not limited to, that the light sources of the backlight unit BLU emit light for the first sub-frame time periods of each of the Nth and (N+2)th frame time periods. The light sources of the backlight unit BLU may emit light for the second sub-frame time period of each of the Nth and (N+2)th frame time periods, or may emit light at the boundary of the first and second sub-frame time periods of each of the Nth and (N+2)th frame time periods.

Figure 13:
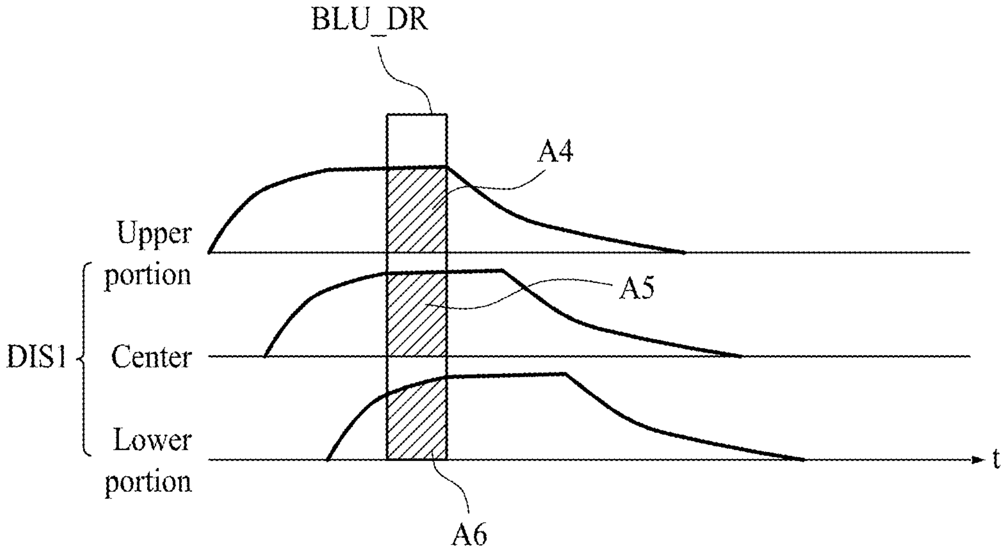
FIG. 13 is an exemplary view illustrating areas of liquid crystal response curves of upper, center and lower portions of a first display panel for a lighting time period according to one embodiment of the present disclosure.

Also, the light sources of the backlight unit BLU may emit light such that a difference among an area A4 of a liquid crystal response curve at a lower portion of the first display panel DIS1 or the second display panel DIS2, an area A5 of a liquid crystal response curve at the center of the first display panel DIS1 or the second display panel DIS2, and an area A6 of a liquid crystal response curve at a lower portion of the first display panel DIS1 or the second display panel DIS2 may be minimized for a lighting time period as shown in FIG. 13. In this case, since the area difference of the liquid crystal response curves in the first display panel DIS1 or the second display panel DIS2 may be minimized, luminance non-uniformity per area of the display panel 110 may be minimized.

As described above, in the embodiment of the present disclosure, the second display panel DIS2 corresponding to a rear display panel displays a second white image WI2 for a time period when the first display panel DIS1 corresponding to a front display panel displays a first source image SI1, and the second display panel DIS2 displays a second source image SI2 for a time period when the first display panel DIS1 displays a first white image WI1. The first white image WI1 may be defined as a transmissive image that transmits light entering the first display panel DIS1, and the second white image WI2 may be defined as a transmissive image that transmits light entering the second display panel DIS2. As a result, in the embodiment of the present disclosure, the first source image SI1 of the first display panel DIS1 may be displayed without being affected by the second display panel DIS2, and the second source image SI2 of the second display panel DIS2 may be displayed without being affected by the first display panel DIS1. Therefore, in the embodiment of the present disclosure, as shown in FIG. 15, the user may definitely see a combined image of the first source image SI1 of the first display panel DIS1 and the second source image SI2 of the second display panel DIS2.

Also, in the embodiment of the present disclosure, the source image data or the white image data may be supplied repeatedly for the first and second sub-frame time periods SB1 and SB2 of each of the Nth and (N+2)th frame time periods, whereby liquid crystal response speed may be enhanced. As a result, in the embodiment of the present disclosure, the light sources of the backlight unit BLU may emit light to correspond to saturated periods of the liquid crystal response curves. Therefore, in the embodiment of the present disclosure, the user may definitely see a combined image of the first source image SI1 of the first display panel DIS1 and the second source image SI2 of the second display panel DIS2.

Figure 14:
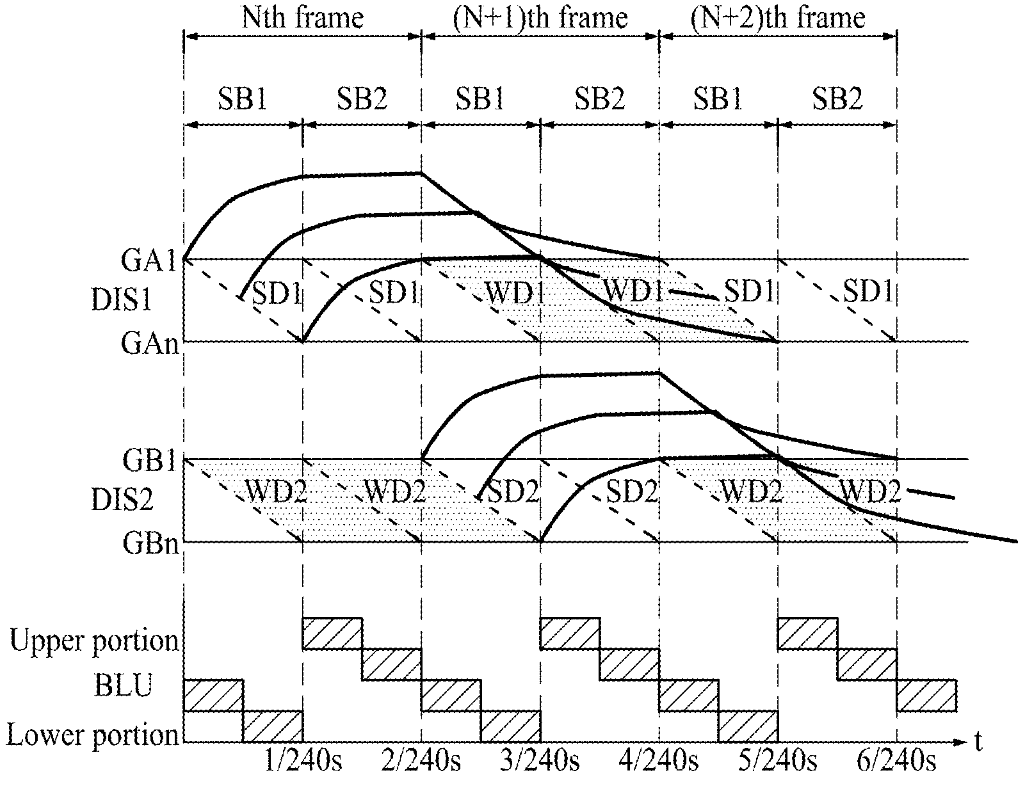
FIG. 14 is an exemplary view illustrating response characteristic of data and liquid crystal supplied to a first display panel, response characteristic of data and liquid crystal supplied to a second display panel, and a lighting timing of a backlight unit according to further still another embodiment of the present disclosure.

FIG. 14 is an exemplary view illustrating response characteristic of data and liquid crystal supplied to a first display panel, response characteristic of data and liquid crystal supplied to a second display panel, and a lighting timing of a backlight unit according to further still another embodiment of the present disclosure.

FIG. 14 illustrates that first and second display panels DIS1 and DIS2 and a backlight unit BLU are driven at a frame frequency of 240 Hz. If the first and second display panels and the backlight unit are driven at a frame frequency of 240 Hz, they may include 240 frame time periods for one second.

Since response characteristic of liquid crystal and data supplied to the first display panel DIS1 and response characteristic of liquid crystal and data supplied to the second display panel DIS2, which are shown in FIG. 14, are substantially the same as those described with reference to FIG. 6, their detailed description will be omitted.

Referring to FIGS. 10 and 14, the first display panel DIS1 may be divided into a plurality of first display blocks DB11 to DB14, the second display panel DIS2 may be divided into a plurality of second display blocks DB21 to DB24, and the backlight unit BLU may be divided into a plurality of lighting blocks LB1 to LB4. The first display blocks DB11 to DB14, the second display blocks DB21 to DB24 and the lighting blocks LB1 to LB4 may be arranged to correspond to one another. FIG. 14 illustrates, but is not limited to, that each of the first and second display panels and the backlight unit is divided into four blocks such as the first display blocks DB11 to DB14, the second display blocks DB21 to DB24 and the lighting blocks LB1 to LB4.

Light of each of the lighting blocks LB1 to LB4 of the backlight unit BLU may be irradiated to each of the first display blocks DB11 to DB14 of the first display panel DIS1 and each of the second display blocks DB21 to DB24 of the second display panel DIS2. For example, light of the first lighting block LB1 of the backlight unit BLU may be irradiated to a 1-1th display block DB11 of the first display panel DIS1 and a 2-1th display block DB21 of the second display panel DIS2. Also, light of the second lighting block LB2 of the backlight unit BLU may be irradiated to a 1-2th display block DB12 of the first display panel DIS1 and a 2-2th display block DB22 of the second display panel DIS2. Also, light of the third lighting block LB3 of the backlight unit BLU may be irradiated to a 1-3th display block DB13 of the first display panel DIS1 and a 2-3th display block DB23 of the second display panel DIS2. Also, light of the fourth lighting block LB4 of the backlight unit BLU may be irradiated to a 1-4th display block DB14 of the first display panel DIS1 and a 2-4th display block DB24 of the second display panel DIS2.

The lighting blocks LB1 to LB4 of the backlight unit may emit light sequentially according to a predetermined duty ratio for each of the Nth and (N+2)th frame time periods. That is, the lighting blocks LB1 to LB4 of the backlight unit BLU may emit light sequentially from the first lighting block LB1 arranged at an upper portion to the fourth lighting block LB4 arranged at a lower portion. Also, as shown in FIG. 15, some of the lighting blocks LB1 to LB4 of the backlight unit BLU may emit light for the first sub-frame time period of each of the Nth to (N+2)th frame time periods and the other lighting blocks may emit light for the second sub-frame time period. In this case, some of the lighting blocks LB1 to LB4 emitted for the first sub-frame time period may correspond to some of the first display blocks arranged above the first display panel DIS1.

As described above, since each of the first display panel DIS1 and the second display panel DIS2 is supplied with image data from the upper portion to the lower portion, liquid crystal response curves at the upper portion, the center and the lower portion of each of the first display panel DIS1 and the second display panel DIS2 are different from one another. In the embodiment of the present disclosure, the lighting blocks LB1 to LB4 of the backlight unit BLU may emit light sequentially from the first lighting block LB1 arranged at the upper portion to the lighting block LB4 arranged at the lower portion. As a result, in the embodiment of the present disclosure, the light sources of the backlight unit BLU may emit light to correspond to saturated periods of the liquid crystal response curves at the upper portion, the center and the lower portion of each of the first display panel DIS1 and the second display panel DIS2. Therefore, in the embodiment of the present disclosure, the user may more definitely see a combined image of the first source image SI1 of the first display panel DIS1 and the second source image SI2 of the second display panel DIS2.

According to the embodiment of the present disclosure, the following advantages may be obtained.

The embodiment of the present disclosure may include the first and second display panels having a predetermined interval, whereby depth may be formed between the first image displayed on the first display panel and the second image displayed on the second display panel. As a result, the embodiment of the present disclosure may provide a stereoscopic image to a user.

In the embodiment of the present disclosure, the second display panel corresponding to a rear display panel displays a second white image for a time period when the first display panel corresponding to a front display panel displays a first source image, and the second display panel displays a second source image for a time period when the first display panel displays a first white image. As a result, in the embodiment of the present disclosure, the first source image of the first display panel may be displayed without being affected by the second display panel, and the second source image of the second display panel may be displayed without being affected by the first display panel. Therefore, in the embodiment of the present disclosure, the user may definitely see a combined image of the first source image of the first display panel and the second source image of the second display panel.

In the embodiment of the present disclosure, the lighting blocks of the backlight unit may emit light sequentially from the first lighting block arranged at the upper portion to the lighting block arranged at the lower portion. As a result, in the embodiment of the present disclosure, the light sources of the backlight unit may emit light to correspond to saturated periods of the liquid crystal response curves at the upper portion, the center and the lower portion of each of the first display panel and the second display panel. Therefore, in the embodiment of the present disclosure, the user may definitely see a combined image of the first source image of the first display panel and the second source image of the second display panel.

In the embodiment of the present disclosure, the source image data or the white image data may be supplied repeatedly for the first and second sub-frame time periods of each of the Nth and (N+2)th frame time periods, whereby liquid crystal response speed may be enhanced. As a result, in the embodiment of the present disclosure, the light sources of the backlight unit may emit light to correspond to saturated periods of the liquid crystal response curves. Therefore, in the embodiment of the present disclosure, the user may more definitely see a combined image of the first source image of the first display panel and the second source image of the second display panel.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A multi-layer display device comprising:

a first display panel comprising:

first pixels in a first display area, a first gate driver configured to supply first gate signals to first gate lines of the first display panel, and a first data driver configured to convert first source image data to first data voltages and supply the first data voltages to the first pixels of the first display panel in accordance with the first gate signals; and a second display panel arranged on a rear surface of the first display panel, the second display panel comprising:

second pixels in a second display area, a second gate driver configured to supply second gate signals to second gate lines of the second display panel, and a second data driver configured to convert second source image data to second data voltages and supply the second data voltages to the second pixels of the second display panel in accordance with the second gate signals, wherein the second pixels of the second display panel display a second white image in the second display area responsive to the second pixels receiving second data voltages that are representative of the second white image, the second white image being displayed for an Nth frame time period when the first pixels of the first display panel display a first source image in the first display area for the Nth frame time period, and the first pixels of the first display panel display a first white image in the first display area responsive to the first pixels receiving first data voltages that are representative of the first white image, the first white image being displayed for an (N+1)th frame time period when the second pixels of the second display panel display a second source image in the second display area for the (N+1)th frame time period, wherein each of the Nth and (N+1)th frame time periods include a first sub-frame time period and a second sub-frame time period, wherein the first pixels of the first display panel display the first source image during the first sub-frame time period of the Nth frame time period and the second sub-frame time period of the Nth frame time period, and the second pixels of the second display panel display the second source image during the first sub-frame time period of the (N+1)th frame time period and the second sub-frame time period of the (N+1)th frame time period, wherein during the first sub-frame time period of the Nth frame time period, the first gate driver is configured to supply a first plurality of the first gate signals to the first gate lines and the first data driver is configured to supply the first data voltages representative of the first source image to the first pixels of the first display panel in accordance with the first plurality of the first gate signals, wherein during the second sub-frame time period of the Nth frame time period, the first gate driver is configured to supply a second plurality of the first gate signals to the first gate lines and the first data driver is configured to again supply the first data voltages representative of the first source image to the first pixels of the first display panel in accordance with the second plurality of the first gate signals, wherein during the first sub-frame time period of the (N+1)th frame time period, the second gate driver is configured to supply a first plurality of the second gate signals to the second gate lines and the second data driver is configured to supply the second data voltages representative of the second source image to the second pixels of the second display panel in accordance with the first plurality of the second gate signals, and wherein during the second sub-frame time period of the (N+1)th frame time period, the second gate driver is configured to supply a second plurality of the second gate signals to the second gate lines and the second data driver is configured to again supply the second data voltages representative of the second source image to the second pixels of the second display panel in accordance with the second plurality of the second gate signals.

2. The multi-layer display device of claim 1, wherein the first pixels of the first display panel display the first source image in accordance with first source image data during the first sub-frame time period and the second sub-frame time period of the Nth frame time period and display the first white image in accordance with first white image data during the first sub-frame time period and the second sub-frame time period of the (N+1)th frame.

3. The multi-layer display device of claim 2, wherein the second pixels of the second display panel display the second white image in accordance with second white image data during the first sub-frame time period and the second sub-frame time period of the Nth frame time period and display the second source image in accordance with second source image data during the first sub-frame time period and the second sub-frame time period of the (N+1)th frame.

4. The multi-layer display device of claim 1, further comprising a backlight unit arranged on a rear surface of the second display panel, including light sources for emitting light.

5. The multi-layer display device of claim 4, wherein the light sources emit light according to a duty ratio for any one of the first and second sub-frame time periods of the Nth and (N+1)th frame time periods.

6. The multi-layer display device of claim 4, wherein the light sources emit light according to a duty ratio at a boundary of the first and second sub-frame time periods of each of the Nth and (N+1)th frame time periods.

7. The multi-layer display device of claim 4, wherein the first display panel is divided into a plurality of first display blocks, the second display panel is divided into a plurality of second display blocks corresponding to the plurality of first display blocks, and the light sources of the backlight unit are divided into lighting blocks corresponding to the first display blocks.

8. The multi-layer display device of claim 7, wherein some of the lighting blocks emit light for the first sub-frame time period of the Nth and (N+1)th frame time periods, and remaining lighting blocks emit light for the second sub-frame time period of the Nth and (N+1)th frame time periods.

9. The multi-layer display device of claim 8, wherein some of the lighting blocks correspond to some of the first display blocks arranged on an upper portion of the first display panel.

10. The multi-layer display device of claim 1, wherein the first display panel and the second display panel are liquid crystal display panels.

11. The multi-layer display device of claim 1, wherein the first source image and the second source image are different images.

* * * * *